(12) United States Patent
Déjean

(10) Patent No.: US 9,008,443 B2
(45) Date of Patent: Apr. 14, 2015

(54) SYSTEM AND METHOD FOR IDENTIFYING REGULAR GEOMETRIC STRUCTURES IN DOCUMENT PAGES

(75) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 335 days.

(21) Appl. No.: 13/530,141

(22) Filed: Jun. 22, 2012

(65) Prior Publication Data

US 2013/0343658 A1    Dec. 26, 2013

(51) Int. Cl.
*G06K 9/46* (2006.01)
*G06K 9/00* (2006.01)

(52) U.S. Cl.
CPC ............................. *G06K 9/00463* (2013.01)

(58) Field of Classification Search
None
See application file for complete search history.

(56) References Cited

U.S. PATENT DOCUMENTS

| | | | |
|---|---|---|---|
| 5,708,730 A | 1/1998 | Itonori | |
| 6,785,420 B2 | 8/2004 | Yamaai | |
| 7,386,789 B2 | 6/2008 | Chao et al. | |
| 7,392,473 B2 | 6/2008 | Meunier | |
| 7,555,711 B2 | 6/2009 | Chao et al. | |
| 7,693,848 B2 | 4/2010 | Dejean et al. | |
| 7,739,587 B2 | 6/2010 | Vion-Dury | |
| 7,899,826 B2 | 3/2011 | Mansfield et al. | |
| 7,937,653 B2 | 5/2011 | Dejean et al. | |
| 2001/0024520 A1* | 9/2001 | Yamaai | 382/199 |
| 2006/0155703 A1 | 7/2006 | Dejean et al. | |
| 2006/0274938 A1* | 12/2006 | Ortega et al. | 382/173 |
| 2012/0005225 A1 | 1/2012 | Chidlovskii | |
| 2013/0014007 A1* | 1/2013 | Kopp et al. | 715/243 |

OTHER PUBLICATIONS

Zanibbi, R., et al. "A Survey of Table Recognition: Models, Observations, Transformations, and Inferences" School of Computing, Queen's University, Oct. 24, 2002, pp. 1-33.
U.S. Appl. No. 12/974,843, filed Dec. 21, 2010, Dejean.
U.S. Appl. No. 13/155,011, filed Jun. 7, 2011, Dejean.
U.S. Appl. No. 13/162,858, filed Jun. 17, 2011, Dejean.

\* cited by examiner

Primary Examiner — Vikkram Bali
(74) Attorney, Agent, or Firm — Fay Sharpe LLP

(57) ABSTRACT

A system and method for identifying regular geometric structures in a document page are disclosed. In the method, for a document page for which a set of page elements have been identified, the method includes identifying, where present, geometric relations among a subset of the page elements, from a predefined set of geometric relations, and a geometric structure comprising regular rows and regular columns, based on the identified geometric relations. Constraints of a definition of a regular geometric structure are applied to the identified geometric structure and, where the subset of page elements includes regular rows and regular columns forming a geometric structure which meets the constraints of the definition of a regular geometric structure, the subset of the page elements is identified as forming a regular geometric structure and may be labeled or tested to determine if it can be expanded by adding one or more rows or columns.

22 Claims, 10 Drawing Sheets

SYSTEM AND METHOD FOR IDENTIFYING REGULAR GEOMETRIC STRUCTURES IN DOCUMENT PAGES

BACKGROUND

The exemplary embodiment relates to document processing and finds particular application in connection with a system and a method for extracting regular geometric structures in a document page.

While the use of electronically created and recorded documents is prevalent, many such electronic documents are in a form that does not permit them to be used other than for viewing or printing. To provide greater accessibility to the content of such documents, it is desirable to understand their logical structure. However, when electronic documents are recovered by scanning a hardcopy representation or by recovering an electronic representation (e.g., PDF or Postscript representation), a loss of logical document structure usually results because the representation of the document is either at a very low level (e.g., bitmap) or an intermediate level (e.g., a document formatted in a page description language or a portable document format).

Geometric (or physical) page layout analysis can be used to recognize the different elements of a page, often in terms of text regions and image regions. Methods are known for determining a document's logical structure, or the order in which objects are laid out on a document image (i.e., layout objects). Such methods exploit the geometric or typographical features of document image objects, sometimes using of the content of objects and a priori knowledge of page layout for a particular document class. Geometric page layout analysis (GPLA) algorithms have been developed to recognize different elements of a page, often in terms of text blocks and image blocks. Examples of such algorithms include the X-Y Cut algorithm, described by Nagy, et al. (A prototype document image analysis system for technical journals. Computer, 7(25): 10-22, 1992) and the Smearing algorithm, described by Wong, et al. (Document analysis system. IBM Journal of Research and Development, 26(6):647-656, 1982). These GPLA algorithms receive as input a page image and perform a segmentation based on information (such as pixel information) gathered from the page. These approaches to element recognition are either top-down or bottom-up and mainly aim to delimit boxes of text or images in a page. While such methods have been useful for segmenting pages one dimensionally, into columns, identifying geometric structures that are two dimensional in nature, such as tables, has proved more difficult. Many approaches to this problem search for graphical lines which delimit the table content (see, for example, Zanibbi, et al., *A Survey of Table Recognition: Models, Observations, Transformations, and Inferences*. School of Computing, Queen's University, Kingston, Ontario, Canada, Report K7L 3N6, Oct. 24, 2002). However, many tables do not include such clear pointers to their structure. Additionally, other two-dimensional regular geometric structures may be encountered which lack features of conventional tables that would otherwise facilitate detection.

The exemplary system and method address these problems and other by facilitating automated detection of regular geometric structures.

INCORPORATION BY REFERENCE

The following references, the disclosures of which are incorporated herein by reference in their entireties, relate generally to page layout analysis:

U.S. patent application Ser. No. 13/484,708, filed on May 31, 2012, entitled TYPOGRAPHICAL BLOCK GENERATION, by Hervé Déjean.

U.S. patent application Ser. No. 13/462,053 filed on May 2, 2012, entitled POST OPTICAL CHARACTER RECOGNITION DETERMINATION OF FONT SIZE, by Jean-Luc Meunier, U.S. Pat. No. 5,708,730, entitled TABLE RECOGNITION APPARATUS, by Katsuhiko Itonori; U.S. Pat. No. 6,785,420, entitled METHOD AND APPARATUS FOR TABLE RECOGNITION, APPARATUS FOR CHARACTER RECOGNITION, AND COMPUTER PRODUCT, by Toshifumi Yamaai; U.S. Pat. No. 7,392,473, issued Jun. 24, 2008, entitled METHOD AND APPARATUS FOR DETERMINING LOGICAL DOCUMENT STRUCTURE, by Jean-Luc Meunier; U.S. Pat. No. 7,693,848, issued Apr. 6, 2010, entitled METHOD AND APPARATUS FOR STRUCTURING DOCUMENTS BASED ON LAYOUT, CONTENT AND COLLECTION, by Hervé Déjean, et al.; U.S. Pat. No. 7,739,587, issued Jun. 15, 2010, ENTITLED METHODS AND APPARATUSES FOR FINDING RECTANGLES AND APPLICATION TO SEGMENTATION OF GRID-SHAPED TABLES, by Jean-Yves Vion-Dury; and U.S. Pat. No. 7,937,653, issued May 3, 2011, entitled METHOD AND APPARATUS FOR DETECTING PAGINATION CONSTRUCTS INCLUDING A HEADER AND A FOOTER IN LEGACY DOCUMENTS, by Hervé Déjean, et al.; U.S. Pub. No. 20060155703, published Jul. 13, 2006, entitled METHOD AND APPARATUS FOR DETECTING A TABLE OF CONTENTS AND REFERENCE DETERMINATION, by Hervé Déjean, et al.; and U.S. Pub. No. 20120005225, published Jan. 5, 2012, entitled METHOD FOR LAYOUT BASED DOCUMENT ZONE QUERYING, by Boris Chidlovskii; U.S. application Ser. No. 12/974,843, filed on Dec. 21, 2010, entitled SYSTEM AND METHOD FOR LOGICAL STRUCTURING OF DOCUMENTS BASED ON TRAILING AND LEADING PAGES, by Hervé Déjean; U.S. application Ser. No. 13/155,011, filed Jun. 7, 2011, entitled A GENERATE-AND-TEST METHOD FOR COLUMN SEGMENTATION by Hervé Déjean; and U.S. application Ser. No. 13/162,858, filed Jun. 17, 2011, entitled DETECTION AND EXTRACTION OF ELEMENTS CONSTITUTING IMAGES IN UNSTRUCTURED DOCUMENT FILES, by Hervé Déjean.

BRIEF DESCRIPTION

In accordance with one aspect of the exemplary embodiment, a method for identifying regular geometric structures in a document page is provided. The method includes, for a document page for which a set of page elements have been identified, providing for identifying geometric relations among a subset of the page elements, from a predefined set of geometric relations, identifying a geometric structure comprising regular rows and regular columns, based on the identified geometric relations, applying constraints of a definition of a regular geometric structure to the identified geometric structure, and where the subset of page elements includes regular rows and regular columns forming a geometric structure which meets the constraints of the definition of a regular geometric structure, identifying the subset of the page elements as forming a regular geometric structure.

In accordance with another aspect of the exemplary embodiment, a system for identifying regular geometric structures in a document page, is provided. The system includes a block identifier which identifies position and size information for a set of page elements in a document page. A structure identifier identifies geometric relations among a subset of the page elements, the geometric relations being selected from a predefined set of geometric relations and, based on the identified geometric relations, identifies a geometric structure, where present, comprising regular rows and regular columns of the page elements and optionally provides for enlarging an identified geometric structure by adding at least one of an additional regular row and an additional regular column of the page elements in the set. A definition checker applies constraints of a definition of a regular geometric structure to a geometric structure identified by the structure identifier and, where the subset of page elements forming the geometric structure meets the constraints of the definition, identifies the subset of the page elements as forming a regular geometric structure. A processor implements the block identifier, structure identifier and definition checker.

In accordance with another aspect of the exemplary embodiment, a method for identifying regular geometric structures in a document page, includes providing a definition of a regular geometric structure. The definition requires that each page element in a regular geometric structure belongs to no more than one regular row and no more than one regular column of the regular geometric structure, each page element of a regular row of the regular geometric structure does not vertically overlap any other page elements of the regular geometric structure other than those in that regular row, and each page element of a regular column of the regular geometric structure does not horizontally overlap any other page elements of the regular geometric structure other than those in that regular column. A regular row is defined as a set of page elements which participate in at least one of a predefined set of horizontal geometric relations. A regular column is defined as a set of page elements which participate in at least one of a predefined set of vertical geometric relations. The method further includes providing for identifying a set of page elements of a document page which meet the definition of a regular geometric structure as a regular geometric structure.

DETAILED DESCRIPTION

Aspects of the exemplary embodiment relate to a system (apparatus) and method for recognizing regular geometric structures in document pages, and in particular, regular geometric structures in which the elements composing the structure comprise blocks of text.

Figure 1:
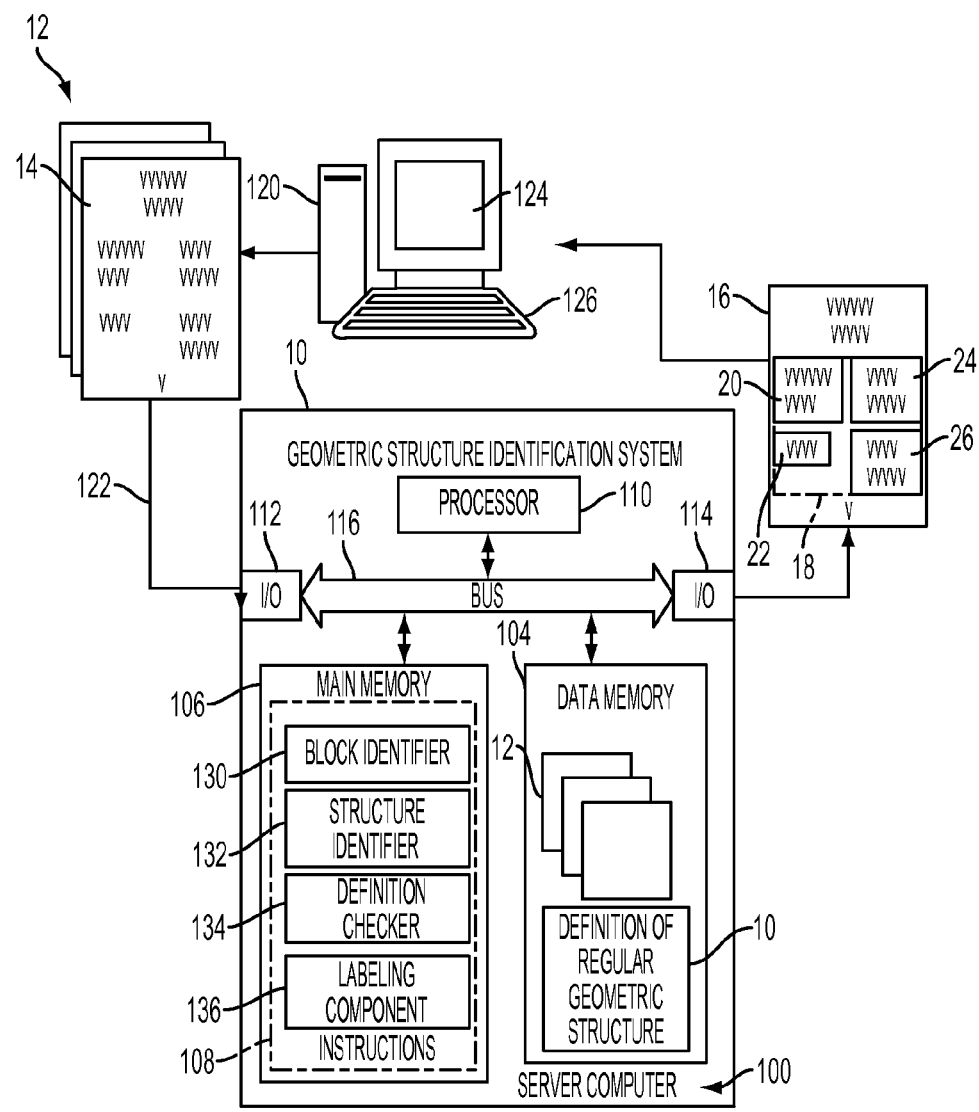
FIG. 1 is a functional block diagram of a geometric structure identification system in accordance with one aspect of the exemplary embodiment.
Figure 2:
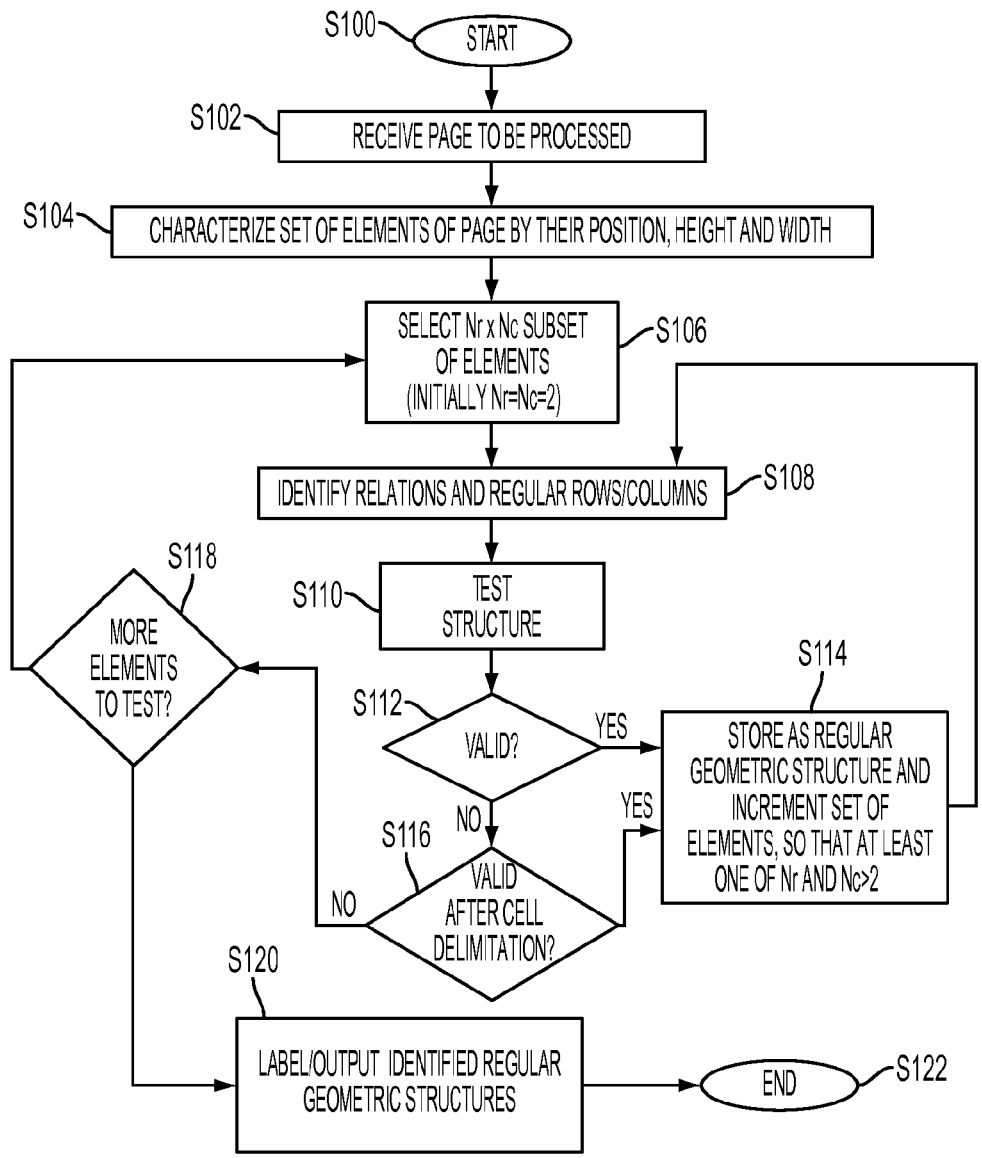
FIG. 2 is a flow diagram illustrating a geometric structure identification method in accordance with another aspect of the exemplary embodiment.
Figure 3:
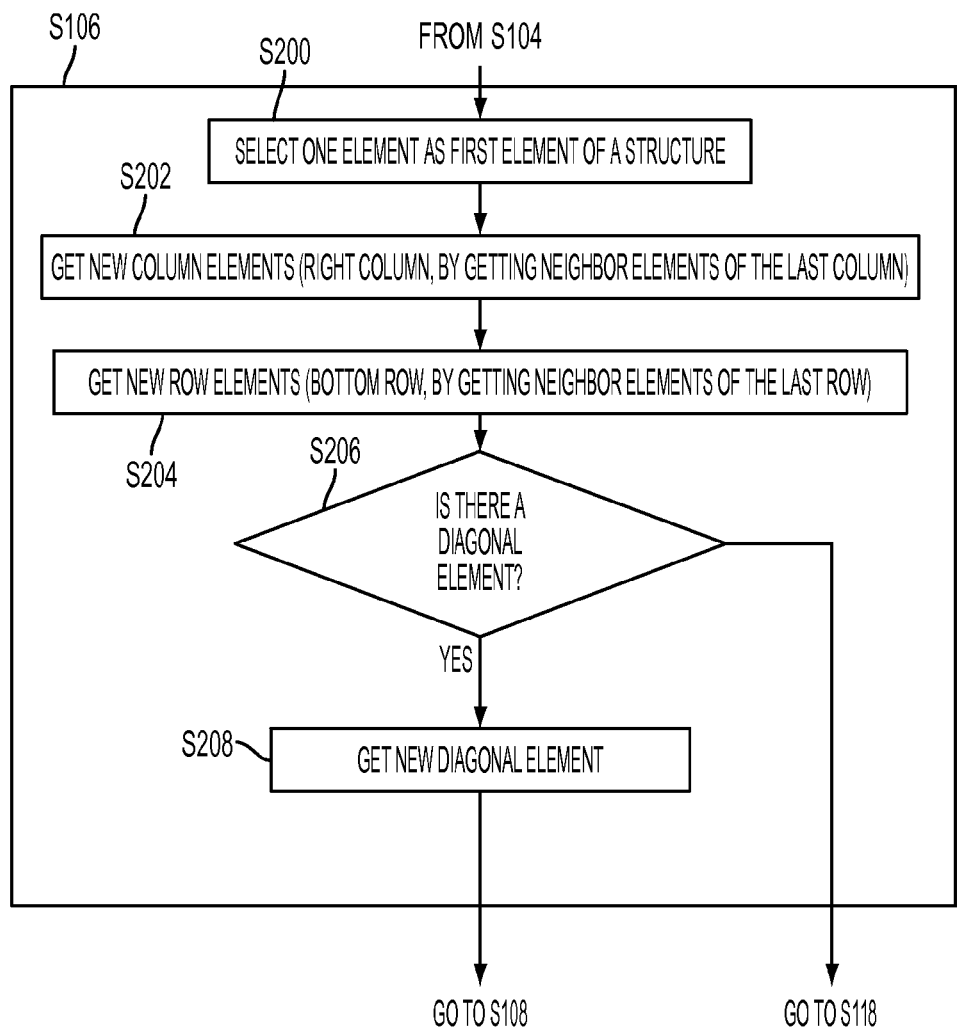
FIG. 3 is a flow diagram illustrating part of the method of FIG. 2.
Figure 4:
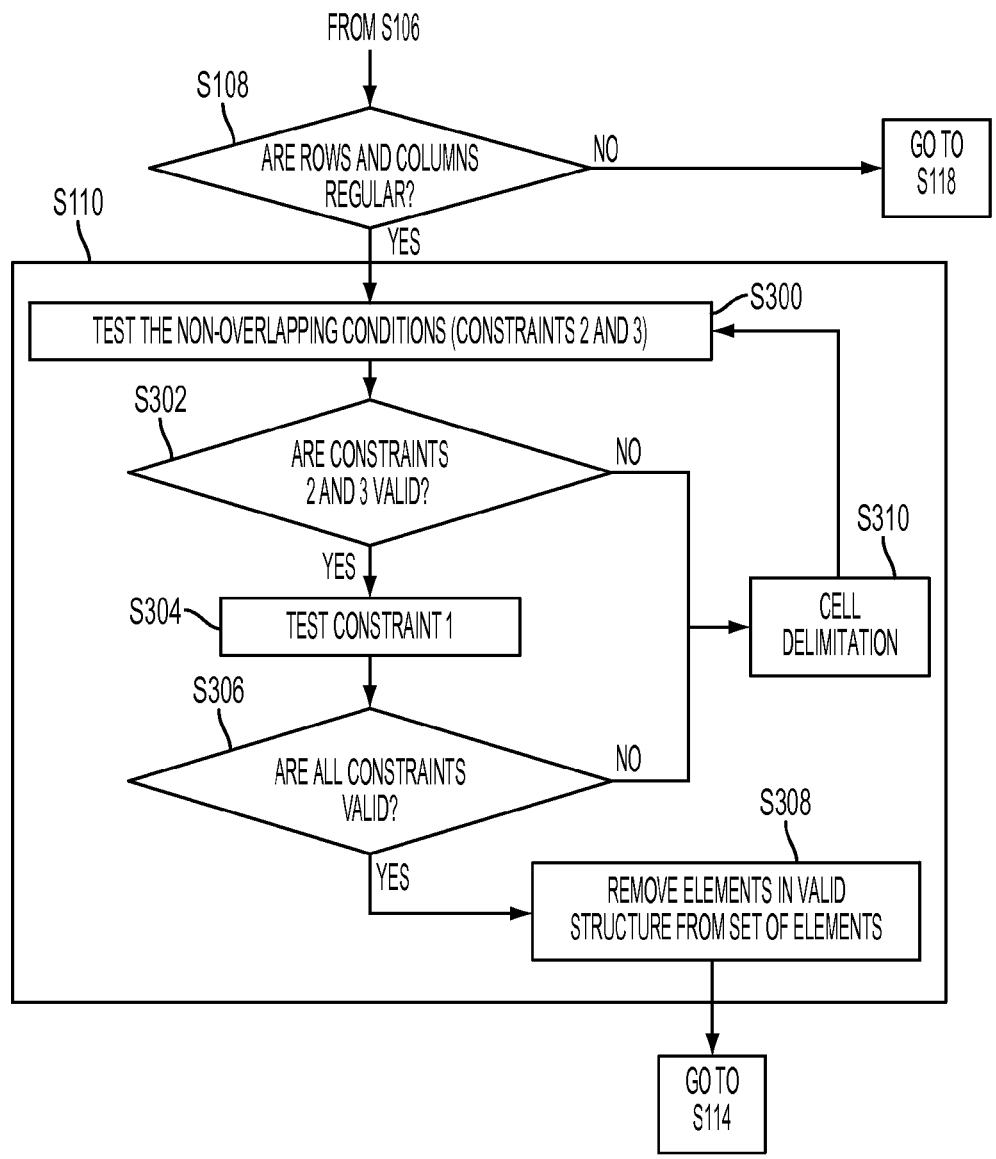
FIG. 4 is a flow diagram illustrating part of the method of FIG. 2.

FIG. 1 illustrates an exemplary apparatus 10 for recognizing regular geometric structures in document pages which may be used for performing the method illustrated in FIGS. 2-4. The system takes as input an unstructured document 12 which includes one or more document pages 14. The system outputs information 16 describing the regular geometric structure(s) 18 (if any), which have been identified on the page 14 and the elements 20, 22, 24, 26 of the document page composing each of the geometric structures 18.

In the exemplary method, an initial two-dimensional regular structure is first built, each of its elements having one or more geometric regular relations with other elements in its respective row and column. Then, a uni-directional extension of the rows and/or columns of the initial regular structure is performed, where certain criteria are met, thereby extending the initial regular structure vertically and/or horizontally to define the output regular geometric structure 18, as described in greater detail below.

The following definitions lay out a framework for the exemplary system and method.

The Properties of a Regular Geometric Structure

Figure 5:
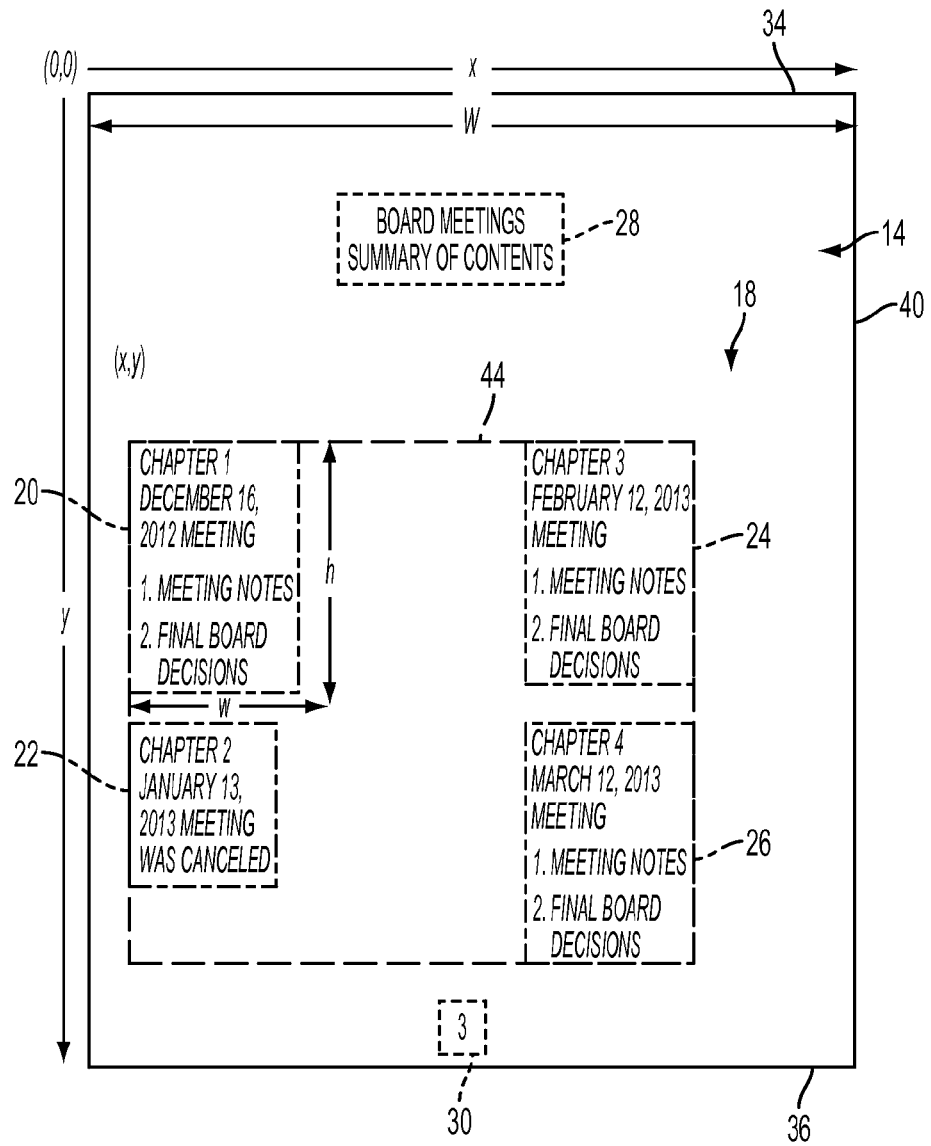
FIG. 5 illustrates an exemplary document page.

FIG. 5 illustrates an example page 14 in which properties of a regular geometric structure 18 are illustrated. By way of example, the width W of the page 14 is shown in direction x and the height H in direction y.

Each of the elements 20, 22, 24, 26, 28, 30 of the page is described by a respective bounding box 32 of vertical height h and horizontal width w, which is the smallest rectangle capable of encompassing that portion of the document content, e.g., text and/or images, which make up the respective element. For example, as illustrated in FIG. 5, each page element 20, 22, 24, 26, 28, 30 includes one or more lines of text, with at least some of the elements generally comprising more than one line of text. Methods for identifying the page elements 20, 22, 24, 26, 28, 30 are described in greater detail below. Each bounding box 32 includes a top edge and a bottom edge which are generally both parallel with, or approximately parallel to, top and bottom edges 34, 36 of the page. Each bounding box 32 further includes a left edge and right edge which are generally both parallel with, or approximately parallel to, left and right edges 38, 40 of the page. The regular geometric structure 18 is also bounded by a bounding box 44, which is the smallest rectangle capable of encompassing all its page elements 20, 22, 24, 26. As will be appreciated, the bounding boxes 32, 44 and other lines illustrated in FIG. 4 are for illustration purposes only and do not represent the actual content of the input page 14.

Figure 6:
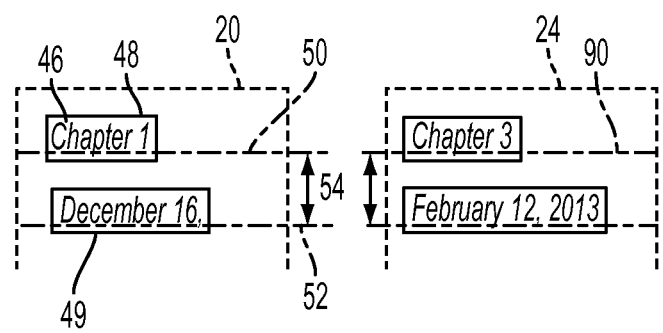
FIG. 6 illustrates segmentation of part of the page of FIG. 5.

In the case of a page element 20 which includes more than one line 46 of text, each line may also be defined by a respective bounding box 48, 49 (FIG. 6). For each line 46 of text, a baseline 50, 52 can be defined which is the invisible line on which the text sits. Descenders, such as in the letters "p" and "y" may extend below the respective baseline, but all other portions of the characters lie above it. The vertical distance 54 between baselines 50, 52 of successive lines of text is referred to as the leading. A set of lines, etc., which have the same or approximately the same leading 54 and which have other features in common may be aggregated into a single page element, as illustrated in FIG. 5.

A row of elements 20, 24 can be considered as a set of two or more page elements which intersect a same horizontal line. A column of elements 20, 22 can be considered as a set of two or more page elements which intersect a same vertical line.

A regular geometric structure 18 is defined as a set of page elements 20, 22, 24, 26, etc. (usually at least four), extending in two orthogonal dimensions whose positions are constrained by their respective geometrical relations.

Formally, let e be an element of a page P of a document, characterized by its position (x, y) in the page, its height h and width w.

Let Rh be a set of horizontal relations. Horizontal relations which may be employed herein include: top-aligned, bottom-aligned, center-aligned, and baseline alignment (if a baseline 50, 52 is known). The predefined set of horizontal relations may include two or more of these.

Let Rv be a set of vertical relations. Vertical relations which may be used include: left-aligned, right-aligned, and center-aligned. The predefined set of vertical relations may include two or more of these.

Let fRh be a function which returns the list, possibly empty, of horizontal relations between two elements $e_i$ and $e_j$.

$$fRh(e_i, e_j) \subset Rh \quad (1)$$

Let fRv be a function which returns the list, possibly empty, of vertical relations between two elements $e_i$ and $e_j$.

$$fRv(e_i, e_j) \subset Rv \quad (2)$$

A set of two or more page elements $(e_1, \ldots, e_n)$ is considered as a regular row Rr if and only if:

$$Rr(e_1, \ldots, e_n) \Leftrightarrow \bigcap_{\substack{i,j \\ i \neq j}}^{n} fRh(e_i, e_j) \neq \emptyset \quad (3)$$

which means that all page elements of a regular row Rr participate in at least one same horizontal relation of the predetermined set of horizontal relations, i.e., they have one or more of the horizontal relations in common.

A set of elements $(e_1, \ldots, e_n)$ is considered as a regular column Cr if and only if:

$$Cr(e_1, \ldots, e_n) \Leftrightarrow \bigcap_{\substack{i,j \\ i \neq j}}^{n} fRv(e_i, e_j) \neq \emptyset \quad (4)$$

which means that all elements of a regular column participate in at least one same vertical relation of the predetermined set of vertical relations, i.e., they have one or more of the vertical relations in common.

Figure 9:
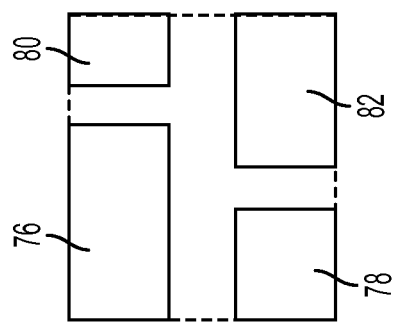
FIGS. 7-9 illustrate example geometric structures.
Figure 8:
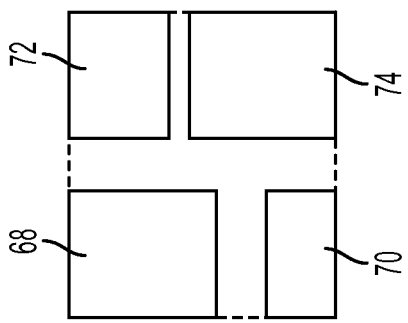
Figure 7:
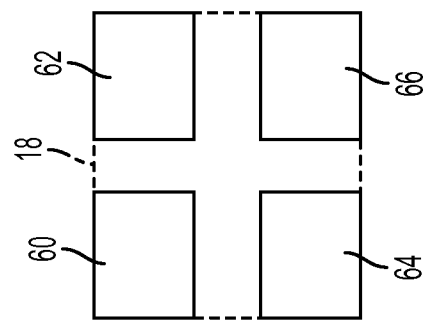

Examples of page elements having the exemplary horizontal and vertical relations are illustrated in FIGS. 7-9.

In FIG. 7, page elements 60 and 62 have a top-aligned horizontal relation and a bottom-aligned horizontal relation because the top edge (respectively bottom edge) of the respective bounding block lies on the same imaginary horizontal line. The same is true for elements 64 and 66. In the case of FIG. 8, elements 68 and 70 have a top-aligned horizontal relation but no bottom-aligned horizontal relation, because their bottom edges do not lie on the same horizontal line. Elements 70 and 74 have a bottom horizontal relation, but no top horizontal relation.

Elements 60 and 62 of FIG. 7 have a center aligned horizontal relation because the horizontal imaginary line which divides the respective bounding block in two lies on the same imaginary horizontal line. The same is true for elements 64 and 66, and elements 76 and 80 of FIG. 9. In the case of FIG. 8, elements 68 and 72 do not have a center-aligned relation, nor do elements 70 and 74.

A baseline alignment horizontal relation is illustrated in FIGS. 5 and 6, where, for example, the respective baselines 50 of the top lines of elements 20 and 24 are aligned with the same horizontal imaginary line 90, and the same must also be true for all successive baselines 52, etc. As will be appreciated, in languages in which the characters are arranged in vertical, rather than horizontal lines, the baselines would be aligned with a vertical imaginary line.

In FIG. 7, page elements 60 and 64 have a left-aligned vertical relation and a right-aligned vertical relation because the left edge (respectively right edge) of the respective bounding block lies on the same imaginary vertical line. The same is true for elements 62 and 66. In the case of FIG. 9, elements 76 and 78 have a left-aligned vertical relation but not a right-aligned vertical relation, because their right edges do not lie on the same vertical line. Elements 80 and 82 have a right-aligned vertical relation, but not a left-aligned vertical relation.

Elements 60 and 64 of FIG. 7 have a center aligned vertical relation because the vertical imaginary line which bisects the respective bounding block lies on the same imaginary vertical line. The same is true for elements 62 and 66, and for elements 68 and 70 of FIG. 8, but not for elements 76 and 78 of FIG. 9.

In the case of elements 68 and 72, for example, the lists of relations may be $fRh(e_i,e_j)=(1,0,0)$ for the horizontal relations (top, bottom, center) and $fRv(e_i,e_j)=(0,0,0)$ for the vertical relations (left, right, center).

Equation (3), which defines a regular row, is thus met by elements 68 and 72, since there is at least one of the listed horizontal relations, and the same is true for all other horizontal pairs of elements shown in FIGS. 7-9. Equation (4) which defines a regular column, is met by all the vertical pairs of elements shown in FIGS. 7-9. There are thus two regular rows and two regular columns identified for the respective geometric structure illustrated in each of these figures. However, as noted below, constraints are applied which limit what is considered a regular geometric structure 18.

As will be appreciated, the sets of horizontal and vertical relations may each comprise fewer, more or different horizontal/vertical relations than those exemplified above.

In the foregoing, where two elements are said to be aligned with the same horizontal (or vertical) line, it is to be appreciated that a threshold may be set for determining whether two elements are aligned with the same line. This threshold may allow elements which are spaced from the line by up to a maximum distance, for, example a maximum number of pixels or millimeters, to be considered to be on the same line. The threshold(s) may be larger for scanned documents than for semi-structured documents, since the OCR processing may lead to larger variations in the estimated positions of the elements. Tests may be performed to identify suitable thresholds which yield acceptable results in terms of, for example, precision and/or recall in the identification of regular geometric structures.

Definition of a Regular Geometric Structure

A set E of elements e is considered as a regular geometric structure when all the following three constraints are met for all elements of the regular geometric structure:

(1) if and only if an element e of E belongs to a unique regular row Rr and a unique regular column Rc (this means that an element cannot belong to more than one regular row or column of the regular geometric structure).

(2) An element e of a regular row Rr cannot vertically overlap any other elements of (E-Rr) (an element of a regular row cannot vertically overlap any other elements of the set E forming the regular geometric structure other than those in that regular row; no vertical overlap means that the element cannot intersect an imaginary horizontal line which is intersected by any element which is not in that regular row of the regular geometric structure).

(3) An element e of a regular column Rc cannot horizontally overlap any other elements of (E-Rc) (an element of a regular column cannot horizontally overlap any other elements of the set E forming the regular geometric structure other than those in that regular column; no horizontal overlap means that the element cannot intersect an imaginary vertical line which is intersected by any element which is not in that regular column of the regular geometric structure).

According to these three constraints, FIG. 7 is considered a regular geometric structure 18, but FIGS. 8 and 9 are not. FIG. 8 fails on constraint (2) (elements 68 and 74 overlap vertically). FIG. 9 fails on constraint (3) (elements 76 and 82 overlap horizontally). FIG. 7 satisfies (1), (2) and (3), while FIG. 8 only satisfies constraints (1) and (3) and FIG. 9, only constraints (1) and (2).

By construction, a regular geometric structure is composed of at least four elements, organized in two regular rows and two regular columns.

Other constraints may be applied such as one or more of:

(4) Each regular row of a geometric structure has the same number of elements.

(5) Each regular column of a geometric structure has the same number of elements.

Constraints (4) and (5) prevent there being empty cells in the resulting regular geometric structure. For some applications, these two constraints may be at least partially relaxed.

Using some or all of the constraints defined above, the exemplary system and method serve to extract regular geometric structures from an input document page.

Example System

Referring once more to FIG. 1, the exemplary system 10 may include one or more specific or general purpose computing devices 100. The system 10 receives, as input, an unstructured document 12 and stores the document in data memory 104 during processing. The document 12 is received in electronic form and can be a technical manual, book, journal publication, report, plan, or the like. The exemplary document 12 is in a page description language, such as a PDF, Portable Document Format (Adobe Systems) file, although other unstructured documents are also contemplated, such as PostScript (Adobe Systems), PCL, Printer Command Language (Hewlett-Packard), such as PCL-5, PCL-5E, PCL-6, PCL-XL, TIFF, BMP, Word document, or the like. In PDF, for example, each page 14 of a document is assigned a set of elements, such as text elements and graphical elements, and their respective sizes and locations are identified in a job ticket. The exemplary document 12 includes one or more pages 14, each of which may be processed independently by the system 10. The page(s) may each include text, images, or combinations thereof. Images can be photographs, graphics, etc.

Main memory 106 of the apparatus 10 stores instructions 108 for performing the exemplary method. These instructions 108 are implemented by an associated processor 110, such as the computer 100's CPU. The computer communicates with external devices via one or more input/output devices 112, 114. The hardware components 104, 106, 110, 112, 114 are communicatively linked by a data/control bus 116.

While a collection of documents could be processed, rather than a single document 12, the exemplary method is best suited to processing documents singly. Prior to inputting, the document pages may be stored in any suitable tangible storage media such as a disk, ROM or RAM, or may be input into the system 10 in the form of a carrier wave, e.g., via the Internet. The input device 112 and/or 114 may include a modem link, a wired or wireless connection, USB port, floppy or hard disk receiver, or the like and may be separated or combined with other components of the system 10. While the illustrated source of the document 12 is a client computing device 120 (which may be similarly configured to computer 10, except as noted), it will be appreciated, that the document 12 may be input from a scanner, or other digital image capture device, with an associated Optical Character Recognition (OCR) engine for processing the output of the scanner to generate the pages 14 of document 12, or from a disk, flash drive or other memory storage device.

The system 10 may comprise one or more computing devices 100 such as a personal computer, PDA, laptop computer, server computer, or combination thereof. Memories 104, 106 may be integral or separate and may represent any type of non-transitory computer readable medium such as random access memory (RAM), read only memory (ROM), magnetic disk or tape, optical disk, flash memory, or holographic memory. In one embodiment, the memories 104, 106 comprise a combination of random access memory and read only memory. In some embodiments, the processor 110 and memory 104, 106 may be combined in a single chip.

The digital processor 110 can be variously embodied, such as by a single-core processor, a dual-core processor (or more generally by a multiple-core processor), a digital processor and cooperating math coprocessor, a digital controller, or the like. The digital processor 110, in addition to controlling the operation of the computer 100, executes instructions stored in memory 106 for performing the method outlined in FIGS. 2-4.

The system 10 may output the information 16, specifically, document image information, to an external computing device, such as device 120, or to another output device, such as a display device, such as a screen, or a hardcopy output device, such as a printer, or the like, or to a remote memory storage device. The source/output device 120 may be connected directly with the system 10 or linked thereto, e.g., via a wired or wireless link 122, such as a local area network or wide area network, such as the Internet. In some embodiments, the information 16 output of the system 10 is stored in memory 104 for further processing, in which content of the document page is labeled or otherwise processed, using the identified regular geometric structures 18 as input information. For example, the information 16 may be used to help identify a table of contents, page numbers, headers and footers, and the like for the document 12. In one embodiment, the elements which are assigned to a regular geometric structure may be excluded from consideration as a page number. The labeled geometric structure 18 may be extracted from the page and stored separately so that a reviewer clicking on that part of the page may extract the content of the geometric structure 18 as a single content block. The system 10 may generate a graphical user interface (GUI) for display to a user. The exemplary GUI may enable a user to interact with the system 10 via a display screen 124 with a user input device 126, such as a cursor control device, keyboard, keypad, joystick, touchscreen, or the like. In one exemplary embodiment the display screen 124 is linked to the client computing device 120 and client device 120 includes a web browser which allows the user to interact with the apparatus 10.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The illustrated instructions 108 for performing the method may be in the form of hardware or a combination of hardware and software and may include an optional block identifier 130 (if elements have not been already identified in the input document page), a structure identifier 132, a definition checker 134, and a labeling component 136. As will be appreciated, system 10 may include fewer or more components while still having the same functionality. For example, components 130, 132, 134, 136, may be combined to form fewer components, or may be functionally separated to form more individual components. These components are best understood with reference to the exemplary method, which is described with reference to FIGS. 2-4.

Briefly, the block identifier 130 characterizes elements of a page by their position, height and width. This component may convert the page description language document 12 to a markup language (e.g., XML) document, if not already in this format. The elements may be initially referred to as blocks, since in some cases, two (or more) blocks may be joined to form a single element if by doing so, the definition constraints for a resulting set of elements can be met.

The structure identifier 132 identifies a set of the elements to test. The set may be iteratively enlarged. The definition checker 134 determines whether the selected elements currently in the set meet the definition constraints. If they do (and the set cannot be further enlarged), the labeler 136 labels the identified set of elements as a regular geometric structure 18.

Example Method

FIG. 2 illustrates the exemplary method which may be performed with the system of FIG. 1. Briefly, the method may include the following:

detection of regular 2-dimensional structures, correction of cell segmentation errors by merging elements, and enlarging the structure to generate a larger geometric structure by at least one of horizontal extension (adding one or more columns) and vertical extension (adding one or more rows).

The method starts at S100. At S102, a page to be processed is received.

At S104, a set of elements for the page is identified (by the block identifier 130) and each block is characterized by its position (relative to a preselected corner of the page), height and width. Initially, elements (blocks) can correspond to two kinds of level: a line level, (or any segmentation which roughly corresponds to lines), or a block level, which correspond to a set of lines with a similar type size and leading size (see above-mentioned application Ser. No. 13/484,708). The choice between the two levels may depend on the targeted regular structure.

Figure 10:
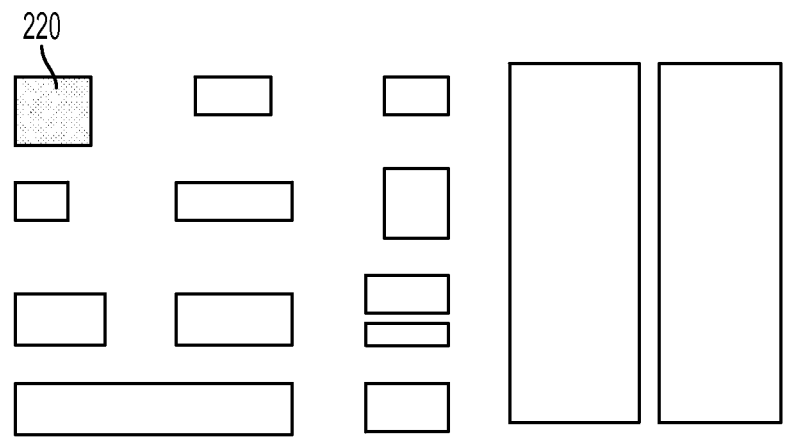
FIG. 10 illustrates a page on which a regular geometric structure may be identified.

At S106, construction of a geometric structure starts with a structure of one element. FIG. 10 may be used as an example, where the shaded element 220 is the element selected for testing. As will be appreciated, all elements of a page may be iteratively tested as the first element, if not covered by a previously-identified geometric structure. Moreover, while the element shown as being selected is the one closest to the top left corner, other elements could be selected as the starting point. Further, it is contemplated that two or more elements may be selected as the first element in turn as it is possible for different geometric structures to be identified, depending on which element is selected first.

Given the first element 220, a subset of elements 220, 222, 224, 226 is selected. This may include the nearest horizontal and vertical elements to make a structure with two rows and two columns.

Figure 11:
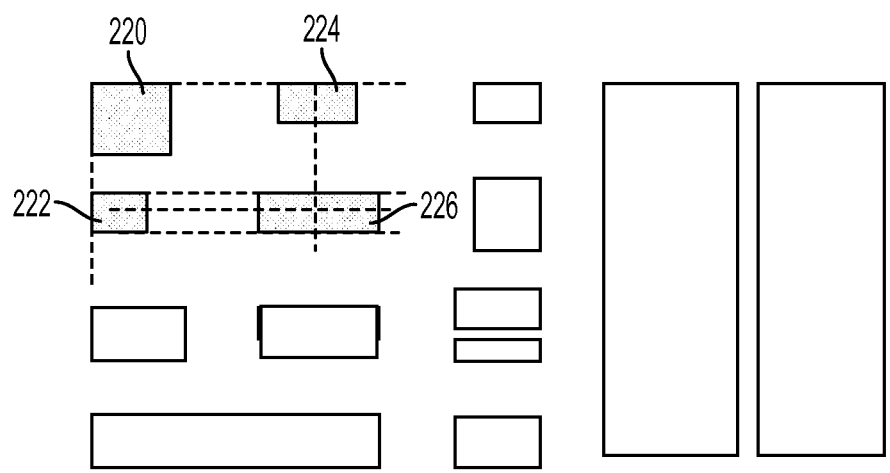
FIG. 11 illustrates a first step in identifying the geometric structure on the page of FIG. 10.

In the method, a two dimensional regular geometric structure is built, each of its elements having geometric regular relations with other elements in its row and column. A regular geometric structure, as noted above, is defined as a set of elements whose positions are constrained by their respective geometric relations. This may be performed in two stages. At S108, regular relations, if any, for the subset of elements are identified. In FIG. 11, he dashed lines represent the horizontal and vertical relations that have been identified between the shaded elements 220, 222, 224, 226 of the same page (shown in FIG. 10). Each element has at least one geometric relation with every other element in its row and column, and thus is considered a geometric structure.

At S110, the structure is tested (by the definition checker 134) to see if it is a valid regular geometric structure, by applying the definition constraints above. In the page of FIG. 11, the four elements 220, 222, 224, 226 forming a geometric structure are found to meet these tests and so the method proceeds to the next step.

Figure 12:
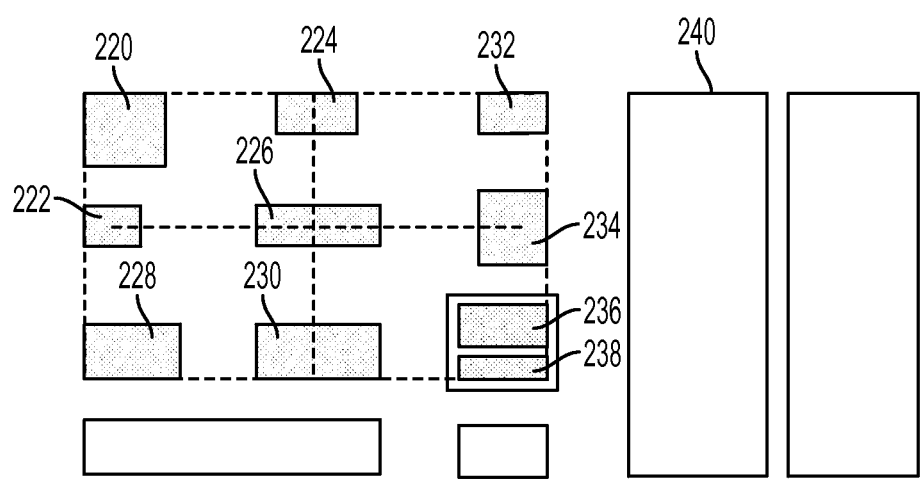
FIG. 12 illustrates a second step in identifying the geometric structure on the page of FIG. 10.

At S112, if it is valid, the method proceeds to S114, where it is stored as a regular geometric structure and the number of elements in the structure is incremented such that it includes an additional row and/or column of elements and returns to S108. However, if at S112, the structure is not a valid regular geometric structure, it is tested to determine if it is valid after cell delimitation (S116). An example of this is shown in FIG. 12, where elements 236 and 238, which do not independently meet the requirements for a geometric structure, are combined to form a single element with a bounding box that is the smallest to contain the two blocks and thereby allow a third column to be added to the structure. This may be the case, for example, where two rows of text are incorrectly assigned to separate blocks where in reality, they are in the same row and column of a table. The method then proceeds to S114.

Initially, the method may be able to add a row and a column at S114, e.g., increment to Nr=Nc=3, but if not, a uni-directional extension (only rows or columns) is performed extending the structure vertically and/or horizontally.

When the regular geometric structure cannot be extended further, the method proceeds to S118, where the next block which has not yet been incorporated into a regular geometric structure is selected as the first element of a new candidate geometric structure. For example, in the page of FIG. 12, block 240 may be selected, however, in this case, no regular geometric structure is found. Once all the elements have been tested the method proceeds to S120, where the geometric structures are labeled, e.g., with xml tags or the like, and may be output or the page may be otherwise processed. In some embodiments the regular geometric structure may be labeled as a table or candidate table.

The method ends at S122.

The exemplary method thus detects regular structures for different input levels, the resulting structures depending on the entry level. This resulting structure can correspond to complete objects which may correspond in practice, to a table (tabular structure) and may be labeled as such, or to parts of objects, such as a regular part of a table.

The method is generic and can be used in multiple contexts, so as to identify table structure, tabular structures, as well as multi-column structures in some cases.

The present method differs from other methods to detect tables in that it detects regular geometric structures, rather than looking for clues such as graphical lines or/and small pieces of content (used to point out table elements). However, as will be appreciated, these other methods may be used to complement and/or refine the exemplary method.

FIG. 3 illustrates example steps in the building of a structure which can be incorporated into S106 (and S114) of the method of FIG. 2. The structure is incrementally extended toward the right (or left) side and the bottom (or top) side, by testing if the new elements share any of the existing relations.

At S200, one element 220 is selected as first element of a structure. At S202, the right neighbor element 224 is collected by applying a request to get new column elements (right column, by getting neighbor elements of the last column).

At S204, the bottom neighbor element 222 is collected by applying a request to get new row elements (bottom row, by getting neighbor elements of the last row).

At S206, a check may be made to determine whether there is a diagonal element 226 which is found using the new elements 224, 222. If there is a diagonal element, then at S208, that element is collected. The method then proceeds to S108.

FIG. 4 illustrates the process of S108 and S110 in accordance with one embodiment. At S108, a determination is made as to whether the elements collected at S106 form a geometric structure by checking that there is at least one regular relation for each element. While only one regular relation is required in each row and column to meet the test for a geometric structure, at this stage, for each row and each column, all regular relations among their elements are kept. This allows them to be used as a basis for identifying regular relations as the structure is enlarged. For example, only the regular relations shown in FIG. 11 need to be checked to see if they can be extended to the additional elements under consideration, as shown in FIG. 12. For example, in FIG. 11 in the second row, three relations are active, but when the row is extended by one element, in FIG. 12, only one of these remains active. The relations which cannot be extended are then dropped from further consideration. If one or more of the rows and columns is not regular (at least one regular relation) the method may proceed to S118, otherwise to S110.

In the embodiment shown in FIG. 4, at S110, the non-overlapping conditions are tested first on the new structure (Definition 1, constraints 2 and 3) at S300. If at S302, the constraints 2 and 3 are valid, the method proceeds to S304, where constraint 1 is tested on the new structure.

If at S306, constraint 1 is valid (regular row and regular column), the new structure is validated and at S308, the elements forming this regular geometric structure are removed from consideration as potential elements of a different geometric structure.

If the constraints are not met, the method may proceed to a cell delimitation step (S310). This is performed to cope with some segmentation errors. When the new regular structure is created, its cells are delimited and all elements inside the cell are regrouped.

The resulting cell is then tested to determine if it satisfies the relational constraints. In FIG. 12, blocks 236 and 238 are merged and remain so for any future iterations.

These steps are iterated until the expansion fails to create new regular rows and columns. Each iteration creates a new row and a new column.

In the exemplary embodiment, when no new elements can be added by bidirectional expansion, an extension is tested for each vertical and horizontal direction, independently. The resulting structure still must comply with Definition 1.

As will be appreciated, the order in which the steps are performed is not limited to those illustrated in FIGS. 2-4 and may proceed in any convenient manner to evaluate all or a portion of the elements in a page. In other embodiments, rather than looking for the smallest regular structure first, the method starts with all elements on the page or a portion thereof and removes elements until a regular geometric structure is found, if any.

While the method is not limited to any specific method for generating elements, if elements have not been identified in the page prior to input to the system, blocks can be built by block identifier 130 during S104 of the method, for example, according to the following methods. In the case of OCRed document pages, the text content of the page may be processed to identify tokens and lines of text. In some cases, this may be performed by the OCR engine, prior to inputting to the system. In this step, starting from the character level, characters are aggregated to form tokens. Two characters are merged into a token if they horizontally overlap and their vertical distance is smaller than a threshold (such as 0.1 times the height of last character). The resulting aggregation roughly corresponds to the level of words for alphabetical scripts. For logographic scripts, such as Chinese or Japanese, a token corresponds to a glyph.

The tokens are then aggregated into text elements. Each text element roughly corresponds to a line or a segment of a line. In one embodiment, two tokens are merged into a same text element if they have the same baseline and the inter-word space is smaller than 1.5 times the height of the preceding token. A method computing the baseline and font-size values is described in U.S. patent application Ser. No. 13/462,053 filed on May 2, 2012, entitled POST OPTICAL CHARACTER RECOGNITION DETERMINATION OF FONT SIZE, by Jean-Luc Meunier, the disclosure of which is incorporated herein by reference in its entirety. These thresholds used for creating tokens and text elements are fairly robust, but not perfect.

In the case of PDF input, the structure may be provided by any suitable tool, such as the one available at https://sourceforge.net/projects/pdf2xml, which uses similar aggregating methods.

Working at the text level (pseudo lines), neighborhood relations between the text elements are computed, based on their geometrical positions. For example, given a text element, text elements above it and below it are tested to determine if there is vertical overlap (i.e., the elements overlap the same vertical line). For these text elements, the distance between their baselines is computed. Text elements with the minimal distance are considered as neighbors. The text elements are sorted vertically. Starting from the top text elements, an iterative loop is used to build blocks. A text element is added to a given block if it is a bottom neighbor of the last text element of that block, and if the leading between it and the last text element corresponds to the current leading of the block. Blocks composed of more than two elements are considered as reliable (at least two leading measures are used to build the block). Blocks composed of only two elements, where only one leading value is used, are considered subject to error (especially for OCR'ed documents). In order to validate such blocks, a frequency histogram may be computed for the leading values for all reliable blocks at the page level (or document level). A non-reliable block is validated if its leading value is used in a threshold proportion/number of the reliable blocks.

Once the set of blocks has been generated, some post processing may be performed to correct for overlapping blocks, which may result in two blocks being merged if their baselines are similar. Under-segmentation may be corrected by identifying vertical white spaces (X-cuts) of at least a threshold width within the block. Where a block can be created to the right of the X-cut with regular vertical alignments of some or all of its lines of text, the cut is validated. The positions and sizes of the remaining blocks (page elements) are then identified, which completes S104.

While the exemplary method has been described in terms of a tabular structure, the method could be adapted to other two dimensional structures, by modifying the relational constraints accordingly. As examples of other two-dimensional structures, a T-structure, a diamond structure and a V-shaped structure are possible structures for which such relations can be defined.

The method can be used in different cases depending on the types of structures which have already been identified in the input document. For example, assume that a column structure has been recognized in the input document (see for example, U.S. application Ser. No. 13/155,011, filed Jun. 7, 2011, entitled A GENERATE-AND-TEST METHOD FOR COLUMN SEGMENTATION by Hervé Déjean for a method for detection of columns). The exemplary method can be used to detect any tabular structure inside a column. In this case, the resulting structures typically correspond to tables. As will be appreciated, while in the best case, the method detects all the elements of the table, in some cases, it detects only regular elements (often numerical data). Headers may sometimes be missed. However, other methods may be used to correct errors, such as comparing tables found on different pages to identify similar features (font types, sizes, positions, etc.) which may provide clues which allow a more complete table detection to be effected.

In another example, the method finds application in cases where various geometric structures may be found on the same page, such as is the case on construction plans. Cover pages of such plans often use tabular structures in order to lay out content. Such layouts are typically challenging for current OCR engines, which may not be able to group elements of a same tabular structure together. An advantage of the present method is the ability to detect many different geometric structures in a document. These structures can be subjected to further processing which allows a fuller description to be associated with some or all of the structures identified. In the specific case of construction plans where no columnar structure is expected, the method may be used directly after typographical block segmentation is performed.

The method illustrated in FIGS. 2-4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 2-4, can be used to implement the method for identifying regular geometric structures.

Illustrative Examples

Without intending to limit the scope of the exemplary embodiment, the following examples illustrate the kind of structures that are detected.

The method was tested on content laid out in a tabular structure without any ruled lines. The method is particularly effective for this kind of structure, where conventional methods typically fail. Two conventional OCR engines were tested, but neither was able to detect the tabular structure. The method was also tested on partial structures (part table, part single column) and was able to detect them. Here, the method recognized that a top central element is not part of the regular structure, as well as a bottom left element.

The method can assist in the detection of regular geometric structures where there are graphical lines to indicate part but not all of the table structure. Overlapping regular geometric structures may be identified and used to add additional information.

The method was also tested on construction plan cover sheets, whose elements are often members of tabular structures. While there were some errors due to noisy text elements and merging sub-parts of two different structures into a same tabular structure, these could be addressed and minimized. In the case of noise, filtering out small elements of one character reduced the errors. However, it is to be appreciated this may not be suited to some table structures. In the case of merging, which accounted for less than 5% of the total recognized structures, recognizing larger structures first, such as columns, was able to reduce the problem.

In some cases, where there may be empty cells in a tabular structure, some relaxation of the definition constraints may be provided which allow such tables to be detected.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A method for identifying regular geometric structures in a document page, comprising:
    for a document page for which a set of page elements have been identified, at least some of the elements comprising more than one line of text, providing for:
        identifying geometric relations among a subset of the page elements that comprise more than one line of text, from a predefined set of geometric relations;

identifying a geometric structure comprising regular rows and regular columns, based on the identified geometric relations;

applying constraints of a definition of a regular geometric structure to the identified geometric structure, the applied constraints being selected from the group consisting of:

each page element in a regular geometric structure belongs to no more than one regular row and no more than one regular column of the regular geometric structure;

each page element of a regular row of the regular geometric structure does not vertically overlap any other page elements of the regular geometric structure other than those in that regular row; and each page element of a regular column of the regular geometric structure does not horizontally overlap any other page elements of the regular geometric structure other than those in that regular column; and where the subset of page elements includes regular rows and regular columns forming a geometric structure which is determined to meet the constraints of the definition of a regular geometric structure, identifying the subset of the page elements as forming a regular geometric structure, wherein at least one of the identifying of geometric relations, the identifying of the geometric structure, and the applying constraints is performed by a computer processor.

2. The method of claim 1, wherein the identifying geometric relations comprises:

identifying horizontal relations between pairs of page elements, the horizontal relations being selected from a predetermined set of horizontal relations; and identifying vertical relations between pairs of page elements, the vertical relations being selected from a predetermined set of vertical relations.

3. The method of claim 2, wherein the identifying of the geometric structure comprises:

based on the identified horizontal relations, considering a group of the page elements as a regular row where the page elements in the group participate in at least one common horizontal relation of the predetermined set of horizontal relations; and based on the identified vertical relations, considering a group of the page elements as a regular column where the page elements in the group participate in at least one common vertical relation of the predetermined set of vertical relations.

4. The method of claim 2, wherein the predetermined set of horizontal relations includes horizontal relations selected from the group consisting of top-aligned, bottom-aligned, center-aligned, and baseline alignment, and the predetermined set of vertical relations includes vertical relations selected from the group consisting of left-aligned, right-aligned, and center-aligned.

5. The method of claim 4, wherein the horizontal relations include at least two of top-aligned, bottom-aligned, and center-aligned.

6. The method of claim 4, wherein the vertical relations include at least two of left-aligned, right-aligned, and center-aligned.

7. The method of claim 1, wherein the identifying of the geometric structure comprises:

identifying a geometric structure which includes at least two regular columns and at least two regular rows.

8. The method of claim 1, wherein the constraints further comprise at least one of:

each regular row of a geometric structure has the same number of elements; and each regular column of a geometric structure has the same number of elements.

9. The method of claim 1, further comprising:

where the subset of the page elements is identified as forming a regular geometric structure, providing for enlarging the subset of page elements to generate a larger geometric structure and where the enlarged subset of page elements includes regular rows and regular columns forming a geometric structure which meets the constraints of the definition of a regular geometric structure, identifying the subset of the page elements as forming a regular geometric structure.

10. The method of claim 9, wherein the enlarging includes identifying at least one of a next column and a next row from the set of elements.

11. The method of claim 9, further comprising, where the subset of page elements identified as forming a regular geometric structure cannot be enlarged or further enlarged by adding at least one row or column, labeling the subset of page elements identified as forming the regular geometric structure.

12. The method of claim 1, further comprising:

providing for merging elements in the subset where the subset of the elements includes regular rows and regular columns forming a geometric structure and where the merging allows the constraints of the definition of the regular geometric structure to be met.

13. The method of claim 1, further comprising, providing for:

selecting a next subset of the set of page elements which has not yet been identified as forming a regular geometric structure and, where the next subset of page elements includes regular rows and regular columns forming a geometric structure which meets the constraints of the definition of a regular geometric structure, identifying the next subset of the page elements as forming a regular geometric structure.

14. The method of claim 1, wherein each page element in the set of page elements is identified by its position on the page, its height and its width.

15. A computer program product comprising a non-transitory recording medium storing instructions, which when executed on a computer, cause the computer to perform the method of claim 1.

16. A system comprising memory storing instructions for performing the method of claim 1 and a processor in communication with the memory for implementing the instructions.

17. A method for identifying regular geometric structures in a document page, comprising:

for a document page for which a set of page elements have been identified, providing for:

identifying geometric relations among a subset of the page elements, from a predefined set of geometric relations;

identifying a geometric structure comprising regular rows and regular columns, based on the identified geometric relations;

applying constraints of a definition of a regular geometric structure to the identified geometric structure, the constraints of the definition of the regular geometric structure including all the constraints in the group consisting of:

each page element in a regular geometric structure belongs to no more than one regular row and no more than one regular column of the regular geometric structure;

each page element of a regular row of the regular geometric structure does not vertically overlap any other page elements of the regular geometric structure other than those in that regular row; and each page element of a regular column of the regular geometric structure does not horizontally overlap any other page elements of the regular geometric structure other than those in that regular column;

where the subset of page elements includes regular rows and regular columns forming a geometric structure which meets all of the constraints of the definition of the regular geometric structure, identifying the subset of the page elements as forming a regular geometric structure, wherein at least one of the identifying of geometric relations, the identifying of the geometric structure, and the applying constraints is performed by a computer processor.

18. The method of claim 17, wherein the constraints further comprise at least one of:

each regular row of a geometric structure has the same number of elements; and each regular column of a geometric structure has the same number of elements.

19. A system for identifying regular geometric structures in a document page, comprising:

a block identifier which identifies position and size information for a set of page elements in a document page, at least some of the elements comprising more than one line of text;

a structure identifier which identifies geometric relations among a subset of at least four of the page elements, the geometric relations being selected from a predefined set of geometric relations and, based on the identified geometric relations, identifies a geometric structure, where present, comprising regular rows and regular columns of the page elements in the subset, and optionally provides for enlarging an identified geometric structure by adding at least one of an additional regular row and an additional regular column of the page elements in the set;

a definition checker which applies constraints of a definition of a regular geometric structure to a geometric structure identified by the structure identifier and, where definition checker determines that the subset of page elements forming the geometric structure meets the constraints of the definition, identifies the subset of the page elements as forming a regular geometric structure, the definition requiring that:

each page element in a regular geometric structure belongs to no more than one regular row and no more than one regular column of the regular geometric structure, each page element of a regular row of the regular geometric structure does not vertically overlap any other page elements of the regular geometric structure other than those in that regular row, and each page element of a regular column of the regular geometric structure does not horizontally overlap any other page elements of the regular geometric structure other than those in that regular column, a regular row being defined as a set of page elements which participate in at least one of a predefined set of horizontal geometric relations;

a regular column being defined as a set of page elements which participate in at least one of a predefined set of vertical geometric relations;

a processor which implements the block identifier, structure identifier and definition checker.

20. The system of claim 19, wherein the structure identifier iteratively selects subsets of page elements until all page elements in the set are considered.

21. The system of claim 19, further comprising a labeling component which labels the subset of the page elements forming a regular geometric structure.

22. A method for identifying regular geometric structures in a document page, comprising:

providing a definition of a regular geometric structure, the definition requiring that:

each page element in a regular geometric structure belongs to no more than one regular row and no more than one regular column of the regular geometric structure, each page element of a regular row of the regular geometric structure does not vertically overlap any other page elements of the regular geometric structure other than those in that regular row, and each page element of a regular column of the regular geometric structure does not horizontally overlap any other page elements of the regular geometric structure other than those in that regular column, a regular row being defined as a set of page elements which participate in at least one of a predefined set of horizontal geometric relations;

a regular column being defined as a set of page elements which participate in at least one of a predefined set of vertical geometric relations;

with a processor, providing for identifying a set of page elements of a document page which meet the definition of a regular geometric structure as a regular geometric structure.

* * * * *